United States Patent [19]
Loomans

[11] 3,719,350
[45] March 6, 1973

[54] SELF-CLEANING VENTING SECTION FOR CONTINUOUS MIXERS

[75] Inventor: Bernard A. Loomans, Saginaw, Mich.

[73] Assignee: Baker Perkins Inc., Saginaw, Mich.

[22] Filed: March 22, 1971

[21] Appl. No.: 126,450

[52] U.S. Cl. .................. 259/6, 259/185, 425/203, 425/204, 425/205
[51] Int. Cl. ........... B01f 7/04, B29b 1/06, B29b 3/00
[58] Field of Search .......... 259/6, 9, 10, 104, DIG. 2, 259/DIG. 8, DIG. 10, DIG. 13, 185, 191, 192, 193; 425/203, 204, 205

[56] References Cited

UNITED STATES PATENTS

| 3,269,708 | 8/1966 | Leister | 259/6 |
| 3,078,511 | 2/1963 | Street | 259/6 UX |
| 3,347,528 | 10/1967 | List et al. | 259/2 |
| 3,367,635 | 2/1968 | Gresch | 259/4 |
| 3,601,370 | 8/1971 | Ruettener et al. | 259/9 X |
| 3,195,868 | 7/1965 | Loomans et al. | 259/104 |

FOREIGN PATENTS OR APPLICATIONS 1,214,386  11/1963  Germany ................ 259/6

*Primary Examiner*—Robert W. Jenkins
*Assistant Examiner*—Alan I. Cantor
*Attorney*—Learman & McCulloch

[57] ABSTRACT

A continuous mixer preferably of the twin-shaft type wherein axially parallel shafts extend through a mixer or reactor barrel and have radially extending mixing and kneading paddles thereon which wipe one another and the chamber walls substantially continuously during rotation. The mixer is provided with at least one vent hole for the removal of volatiles between the barrel inlet and outlet, and a member is provided on at least one of the shafts which moves material in a direction away from the vent hole as the shafts revolve.

15 Claims, 4 Drawing Figures

INVENTOR
BERNARD A. LOOMANS
BY
*Learman & McCulloch*
ATTORNEYS

PATENTED MAR 6 1973 3,719,350

INVENTOR
BERNARD A. LOOMANS

BY
Learman & McCulloch

ATTORNEYS

SELF-CLEANING VENTING SECTION FOR CONTINUOUS MIXERS

BACKGROUND OF THE INVENTION

This invention relates to continuous mixers, and particularly those well suited to what may be termed the power kneading of plastic and like materials, which subject the material being processed to an intense shearing and kneading action. In such mixers the plastic is fed to the mixer in the form of a powder, for instance, and is heated therein to a temperature at which it forms a plastic mass which is moved from one end of the mixer to the other, and subjected to a kneading, mixing and blending action during its travel to an exit out which it is extruded.

In such mixers, provision must be made for the venting of volatile materials which are released by the material being processed and, dependent on the operation, suction may be employed at the vent hole to aid in the removal of such gases. One of the problems with mixers of this general character for mixing plastic, powdered, solid or liquid materials is the tendency for the pressured material to ride out of the vent port during the continuous forwarding of the material through the mixer. This loss of material and plugging of the vent hole is undesirable for many reasons and in a vacuum volatiles removal system, fouling of the vacuum system can create additional problems.

One of the prime objects of the present invention is to design a mixer in which means is provided in an internal venting chamber or compartment which leads to the vent port for continuously moving material in a direction away from the vent port and toward the discharge end of the mixer so that the chamber which leads to the vent hole is self-cleaning in character and material is prevented from moving in to block the vent hole.

A further object of the invention is to provide a mixer, having the attributes mentioned, wherein the accumulation of residual material in any portion of the mixer is substantially avoided, so that old material does not become mixed with, and contaminate, material advancing through the machine.

Still another object of the invention is to design a continuous mixer of the character described which is relatively simple in construction, and can be relatively economically manufactured and assembled.

Other objects and advantages of the present invention will become apparent to those of ordinary skill in the art when considering the following description in relation to the accompanying drawings.

SUMMARY OF THE INVENTION

In the mixer to be described, the material coming from a first stage section flows through a throat section to a second stage section and the throat section is surrounded by a gas collecting chamber communicating with a radially extending vent hole. Helical prongs extend axially rearwardly in the gas collecting chamber and are driven in a direction to move material forwardly out of the chamber so that material does not accumulate therein and interfere with the venting function. Preferably, the mixer is a twin shaft mixer and includes extruder screws in its second stage. The venting section is formed in an orifice plate which is sandwiched between the first and second stage barrel sections.

THE DRAWINGS

DESCRIPTION OF THE PREFERRED EMBODIMENT

Figure 1:
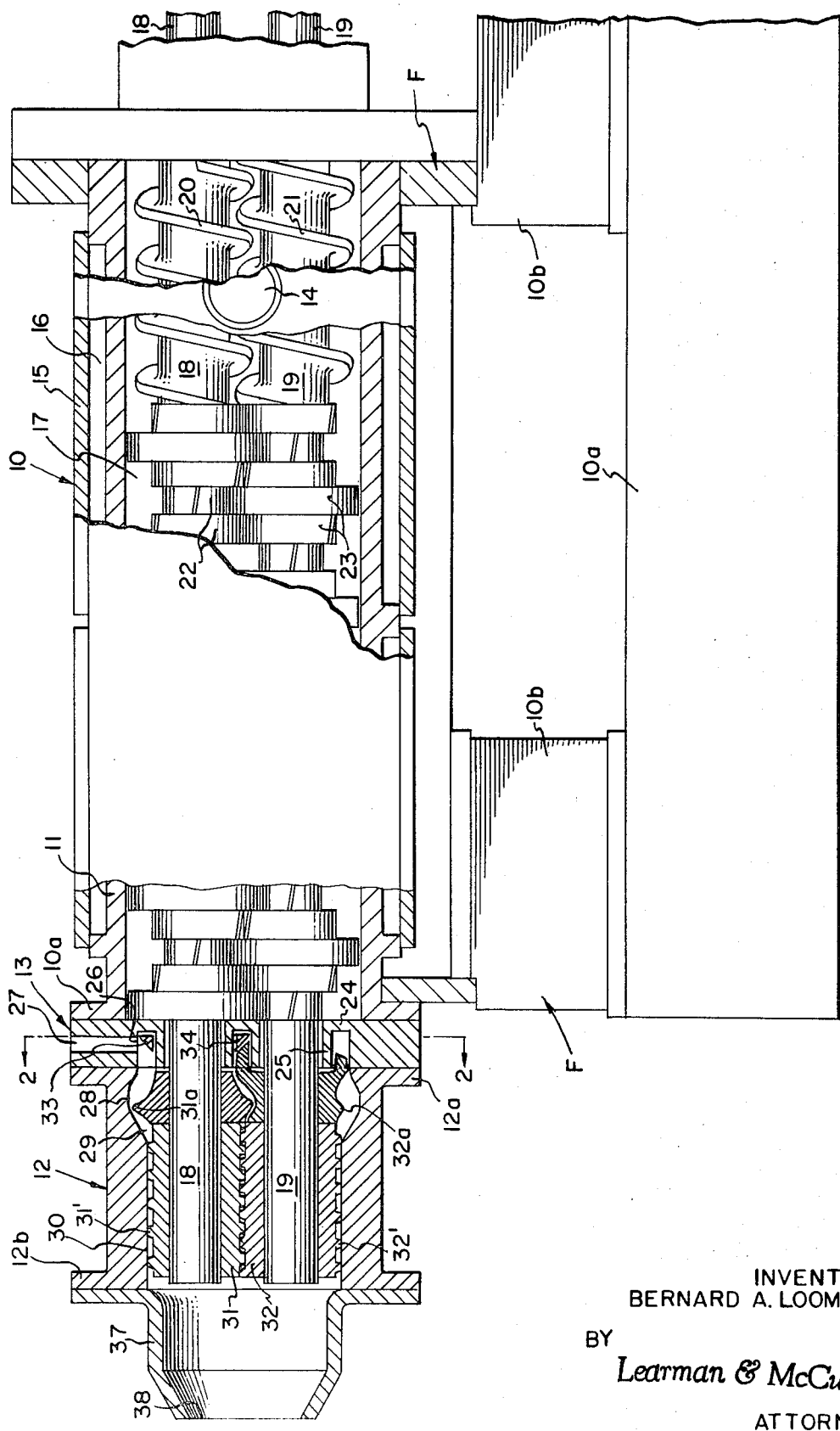
FIG. 1 is a partly sectional, side elevational view of a continuous mixer which incorporates the subject matter of the invention.

Referring now more particularly to the accompanying drawings, a mixer housing, generally designed 10, is shown as comprising a first stage barrel section 11, and a second stage barrel section 12, separated by a sandwiched orifice plate generally designated 13. The mixer housing 10 may be conveniently supported on a frame F which includes a base 10a and pedestals 10b.

Figure 2:
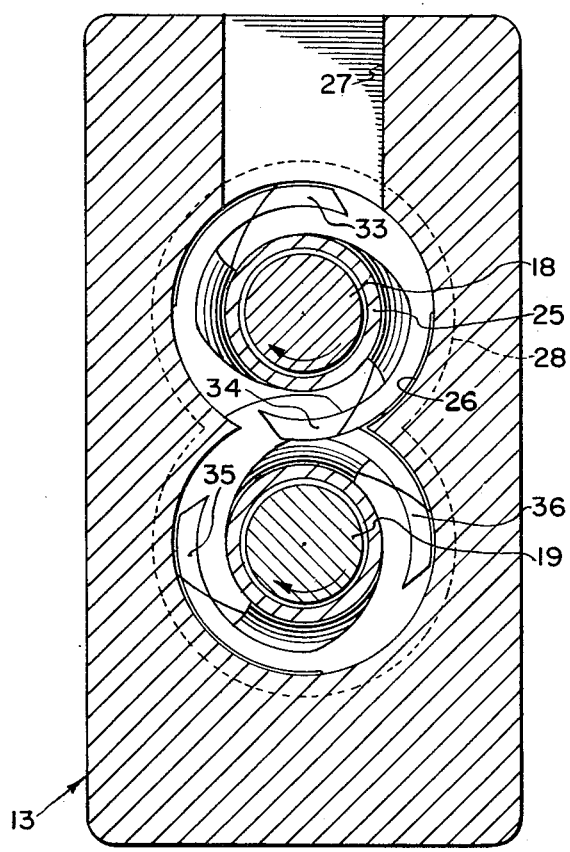
FIG. 2 is an enlarged, transverse sectional view taken on the line 2—2 of FIG. 1.

The first stage barrel section 11, which includes a side inlet opening 14, is well described in applicant's assignees' U.S. Pat. Nos. 3,198,491; 3,423,074; and 3,463,459, which are incorporated herein by reference, and accordingly will only be briefly described. It is jacketed as at 15 to provide an annular space 16 surrounding the barrel section through which a heating fluid, for example, may be continuously circulated to heat the material introduced through orifice 14 to a temperature proper for mixing or kneading it. The barrel 10 is shaped to provide a mixing and kneading chamber 17 which is FIG. 8 in shape, and in which a pair of axially parallel shafts 18 and 19 are mounted for rotation in the usual manner. Mechanism such as shown in the aforementioned U.S. Pat. No. 3,198,491 or in applicant's assignees' U.S. Pat. No. 3,387,826 may be employed to drive the shafts 18 and 19 in the same direction of rotation and (see FIG. 2) at the same speed.

Provided on the shafts 18 and 19 at the upstream end of the mixer are advancing or forwarding worm paddle sections 20 and 21 which receive the material from inlet port 14 and move it to a series of helically arranged paddles 22 and 23 on the shafts 18 and 19. The paddles 22 and 23 are arranged on their respective shafts in mating pairs in the manner indicated in the patents mentioned. They may be of lenticular shape and displaced 90° one to the other. The pairs of paddles may be termed "mating" or "matching" inasmuch as they continually wipe one another as well as the interior wall of the barrel section 10.

Figure 3:
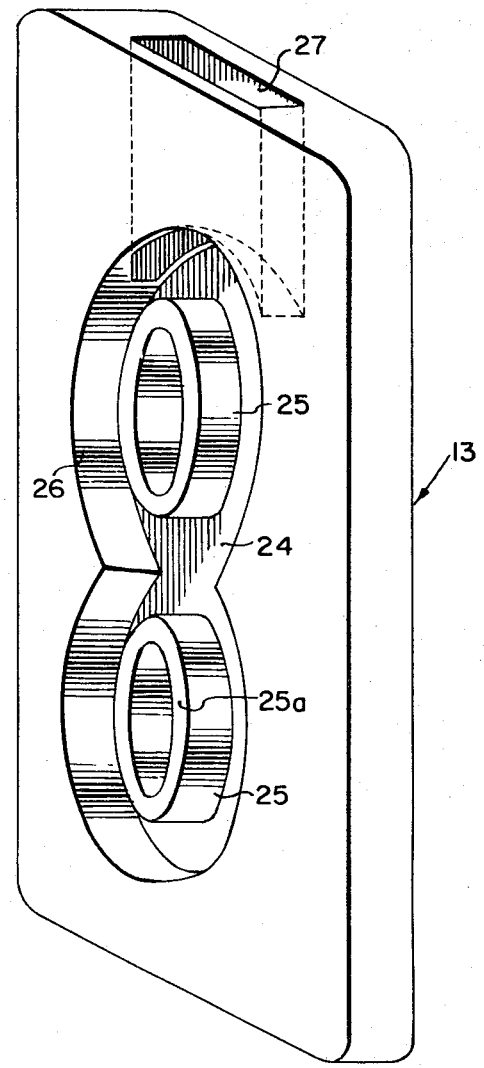
FIG. 3 is an enlarged perspective view of the venting orifice plate only.
Figure 4:
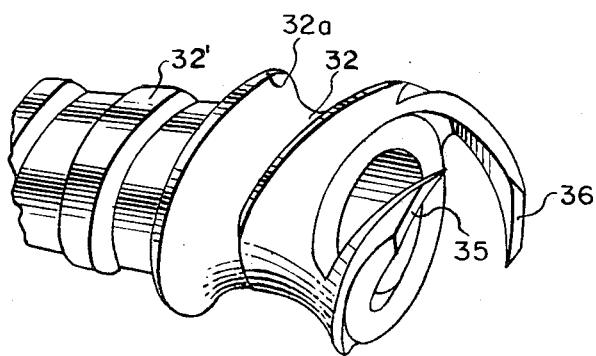
FIG. 4 is an enlarged fragmentary, perspective view of the rear end of one of the extruder sleeve sections showing the rearwardly projecting material direction reversing helical prongs.

The downstream end of kneading chamber 17, is open and the barrel section 10 is flanged as at 10a so that the orifice plate 13 may be readily secured to it. FIG. 3 particularly shows the orifice plate 13 which, as shown, has a rear or upstream wall portion 24 supporting a throat section comprising a pair of forwardly projecting collars 25 which extend forwardly from the mixing chamber 17 and deliver material therethrough. Adjustable orifice size adjusting rings (not shown) of the type shown in U.S. Pat. No. 3,387,826 may be provided on the shafts 18 and 19 to permit the volumetric discharge to be controlled.

Surrounding the throat sections 25 is a FIG. 8 shaped, gas collecting compartment or chamber 26, cut in the front face of plate 13, which leads to a radially extending vent hole 27 through the top of plate 13. As indicated earlier, the vent opening 27 may be connected to a suction tube which leads from the mixer to suitable vent gas treating and disposing apparatus, but for the sake of convenience, I have shown no such tube in the drawings.

The barrel section 12, which I have previously mentioned, is internally configured to provide a chamber portion 28 of "FIG. 8" shape which preferably is of the same size as the compartment 26 in plate 13 and a chamber portion, which decreases in size as at 29 while maintaining its shape, and leads to a "FIG. 8" shaped chamber portion 30 of a size to accommodate the main body of the extruding screw sections 31 and 32 which are fixed to shafts 18 and 19 at the exit end of the mixer. The worms 31 and 32, which are also co-wiping and of lenticular cross-section, are shaped to continuously wipe one another and the chamber walls 30. They have helical thread portions 31' and 32' which gradually are radially enlarged at their upstream ends as at 31a and 32a so that they extend into chamber sections 28 and 29. Projecting axially rearwardly or in an upstream direction from each section 31 and 32 are co-wiping pairs of helical prongs, 33 and 34 on extruder worm section 31, and 35 and 36 on worm section 32. While, for the sake of clarity in the drawing, the various surfaces are not shown in engagement, it is to be understood that the helical prongs 33 through 36 also continuously wipe the radially inner and outer peripheral surfaces of chamber 26, as well as the radial wall 24 and the radial front walls 25a of the two throat sections 25. Similarly, the thread sections 31a and 32a wipe the chamber walls 28 and 29.

At the downstream end of the mixer, a discharge fitting 37 having an axial discharge opening 38 is provided out which the material being mixed may be extruded. It is to be understood that the sections 18, 19, 22, 23, 31 and 32 may be keyed to the shafts 18 and 19, or may be formed integral therewith. The barrel section 12 is also preferably flanged as at 12a and 12b to facilitate securing it to plate 13 and attaching discharge section 37.

THE OPERATION

In the operation of the mixer, material to be mixed is fed continuously into inlet 14 and exits, after being properly mixed, through the outlet 38. The major portion of the mixing and kneading accomplished is accomplished in the first stage in barrel section 11 and, at the exit or downstream end of barrel 11, the material is forced through the reduced flow area throats or collars 25 to a barrel chamber portion 28 which is of the same size and shape as chamber 17. Material, issuing from the throat sections 25 and entering chamber sections 28 and 29, is prevented from moving up into vent hole 27 by the prings 33 through 36 which are revolved in a direction to reverse any rearward flow of material and return it forwardly to the metering portion 30 of the barrel chamber. Volatiles released by the material are able to move more freely out vent hole 27. The prongs 33 and 34 which have the abbreviated paddle-shaped cross-section shown in FIG. 2, continuously wipe the prongs 35 and 36 which are of similar cross-section and are disposed in 90° angularly offset relation to the prongs 33 and 34.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

I claim:

1. In continuous mixing, kneading and like machines: barrel means providing a material treating chamber and having an axially spaced inlet and outlet; at least a pair of substantially axially parallel shafts extending axially in said barrel means; means for revolving said shafts; radially extending mixer sections on said shafts shaped to wipe one another and the chamber walls substantially continuously during said rotation; radially extending vent hole means for the removal of gases in said barrel means between said inlet and outlet; and co-wiping projecting means connected with each of said shafts to rotate therewith and shaped to space the radially inner extremity of a portion of each projecting means radially from said shaft and to move material in a direction away from said vent hole means as said shafts revolve.

2. In mixing, kneading and like machines: a barrel forming a material treating chamber and having an axially spaced inlet and outlet; at least one substantially axially extending shaft in said barrel; means for revolving said shaft; radially extending material forwarding means on said shaft; a vent hole for the removal of gases communicating with said barrel between said inlet and outlet; vent bypass means provided between said inlet and outlet for channeling material to said barrel downstream of said vent hole from a position upstream of said vent hole; and projecting means on said shaft substantially radially between said vent bypass means and vent hole, shaped to move material in a direction away from said vent hole as said shaft revolves.

3. The combination defined in claim 2 in which said bypass means includes a reduced area throat portion relative to said barrel chamber radially opposite said vent hole through which material passes forwardly from said inlet toward said outlet, an increased area barrel chamber relative to said throat portion is provided downstream thereof, and a compartment is provided radially outward of said throat portion and communicating with said downstream barrel chamber portion and vent hole.

4. In continuous mixing, kneading and like machines: barrel means providing a material treating chamber and having an axially spaced inlet and outlet; a shaft extending axially in said barrel means; means for revolving said shaft; a radially extending mixer section on said shaft; radially extending vent hole means for the removal of gases in said barrel means between said inlet and outlet; and projecting means connected with said shaft to rotate therewith and shaped to space the radially inner extremity of said projecting means radially from said shaft and to move material in a direction away from said vent hole means as said shaft revolves.

5. The combination of claim 2 wherein said barrel includes a first section and a second section separated by said vent bypass means which comprises a throat portion means generally radially opposite said vent hole; one of said first and second barrel sections being enlarged in cross-sectional area relative to said throat section means and said throat section means having a compartment around it leading to said vent hole; said projecting means extending generally axially in said compartment and being helically shaped to return material in said compartment in a direction axially away from said vent hole.

6. The combination of claim 5 in which at least a pair of shafts are provided in said barrel and said throat section means comprises a pair of spaced apart throat sections surrounded by said compartment; said projecting means comprising co-wiping prongs fixed to said shafts; and means for driving said shafts in the same direction of rotation and at the same speed.

7. The combination defined in claim 6 in which each shaft mounts a pair of prongs shaped to wipe the compartment and said prongs on the shafts are relatively angularly offset so as not to interfere one with the other.

8. The combination defined in claim 1 in which said barrel means includes a throat portion radially opposite said vent hole means having passage means through which material passes forwardly from said inlet to said outlet; and a compartment radially outward of said throat portion, and communicating with said barrel chamber and vent hole means, is provided in said barrel means; said projecting means extending axially rearwardly in said chamber from each shaft to return non-gaseous material proceeding toward said vent hole means forwardly.

9. The combination defined in claim 8 in which said projecting means comprise helically extending, radially co-wiping prongs mounted on said shafts in angularly predetermined relationship; and said means for revolving said shafts drives them in the same direction of rotation and at the same speed.

10. The combination defined in claim 9 in which said mixer sections comprise spaced apart mixing worm sections separated by said throat portion which communicates them.

11. The combination defined in claim 9 in which the prongs are in wiping engagement with radially inner and outer peripheral walls of said compartment, the radial wall of said throat, and the upstream radial wall of said compartment.

12. The combination defined in claim 9 in which said barrel chamber downstream of said throat portion is enlarged in cross-sectional area relative to said throat section and said compartment comprises an axially rearwardly extending extension thereof from which said vent hole means leads radially.

13. The combination defined in claim 8 in which said throat portion passage means is reduced in cross-sectional area relative to the cross-sectional area of said barrel chamber immediately upstream thereof.

14. The combination defined in claim 1 in which said barrel means comprises a first and a down-stream barrel section separated by a sandwiched orifice plate in which a vent port comprising said vent hole means extends radially; and which includes passage means for leading material from one section to another and a compartment, radially surrounding said latter passage means and communicating with the downstream barrel chamber portion, in which said projecting means is received.

15. The combination defined in claim 1 in which said projecting means comprise helices on said shafts which are radially co-wiping.

* * * * *